April 13, 1948. F. MILLER 2,439,521
REDUCING GEAR MECHANISM
Filed Jan. 8, 1945 2 Sheets-Sheet 1

INVENTOR.
Frank Miller,
BY
David Manly Keller
Attorney.

April 13, 1948.  F. MILLER  2,439,521
REDUCING GEAR MECHANISM
Filed Jan. 8, 1945  2 Sheets-Sheet 2
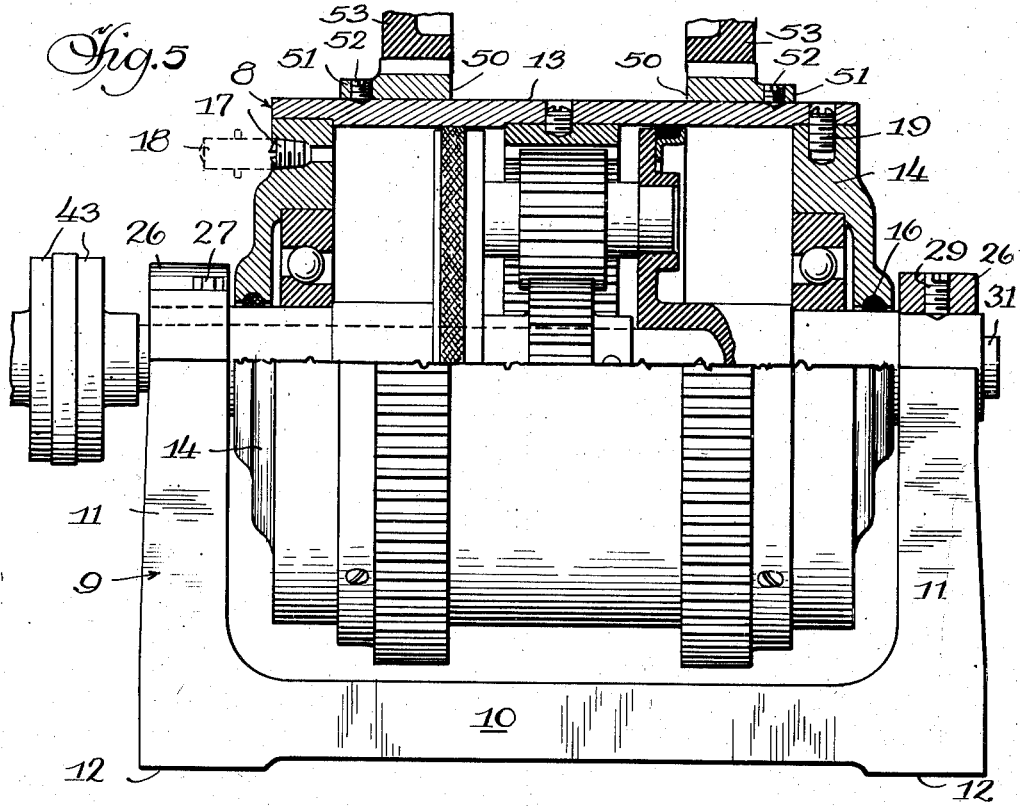
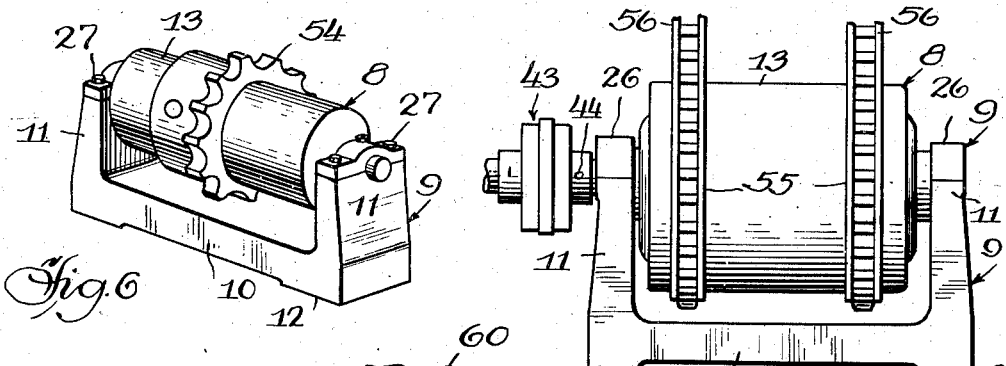
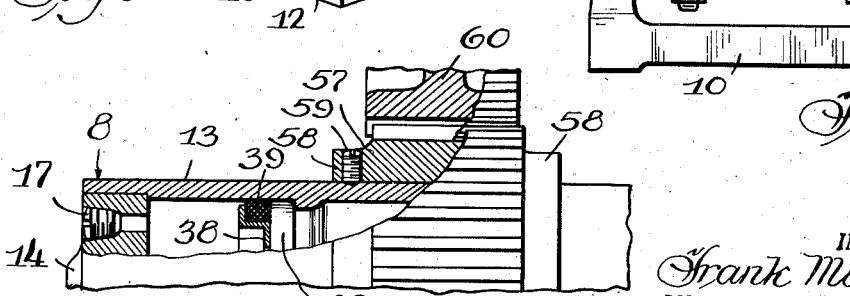
INVENTOR.
Frank Miller
BY
David Manly Steller
Attorney Patented Apr. 13, 1948

2,439,521

UNITED STATES PATENT OFFICE 2,439,521

REDUCING GEAR MECHANISM

Frank Miller, Chicago, Ill.

Application January 8, 1945, Serial No. 571,913

9 Claims. (Cl. 74—421)

The instant invention appertains to reducing gear, or reduction gear, forms of transmission which may be used to ultimately drive a terminal unit in a system of power transmission, or which may be used intermediately with respect to a conveyor drive or transmission system.

One object of my invention is to provide a compact reduction gear mechanism which may be packed with lubrication so as to permit use of the unit or mechanism for long periods of time requiring but little or practically no attention.

Another object of my invention is to provide a reduction gear mechanism which is compact and confined within the periphery of the transmission element requiring very little space as compared to standard units of this type, and also furnishing an ideally assembled unit for interchangeable positioning thereof in lines of power or conveyor transmission.

Another object of my invention is to provide a unit or mechanism of the aforementioned character which is, particularly, suitable for belt drive or transmission.

A still further object of my invention is to provide a unit or mechanism of the aforementioned character which is compact and which is, particularly, suitable for gear drive or transmission.

A still further object of my invention is to provide a compact reduction gear mechanism of the aforementioned character which is, particularly, suitable for sprocket and chain type of transmission.

Other, further, an ancillary objects, and advantages, will become readily apparent as best understood and appreciated from the following description of the modified embodiments thereof, selected for purposes of illustration, and shown in the accompanying drawings, wherein like symbols are used to designate like parts, and in which:

Fig. 4 is a fragmentary view showing a slight modification of my invention making it, particularly, adaptable for gear drive or transmission.

Fig. 5 is a view similar to Figure 2, with the exception that the drum element has been modified for a balanced arrangement for gear drive transmission, in duplex form, as distinguished from the form shown in Figure 4.

Fig. 6 shows a perspective view of a slightly modified form of my invention adapted, particularly, for sprocket and chain type of transmission, and Fig. 7 is a front view showing my invention, slightly modified, for a balanced arrangement of a duplex sprocket and chain type of transmission.

Figures 1, 2, 3:
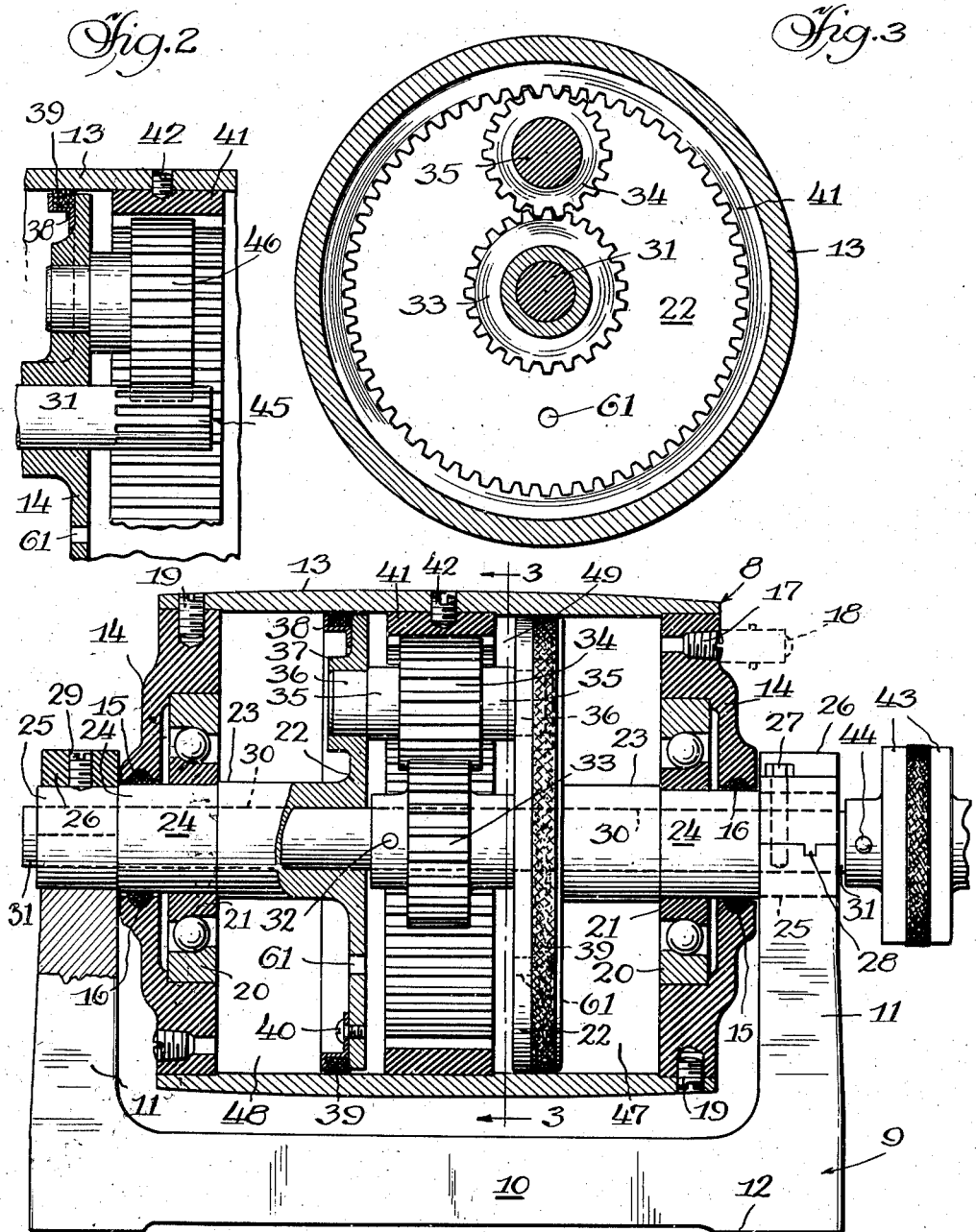
Fig. 1 represents a longitudinal cross-sectional view of my invention.
Fig. 2 shows a fragmentary portion similar to the longitudinal cross-section shown in Figure 1, being slightly modified to permit assembly and dismantling thereof more readily.
Fig. 3 is a transversal cross-sectional view taken, substantially, on the lines 3—3 of Figure 1.

Referring to Figure 1, the numeral 8, generally, designates the rotor structure of my invention, whereas 9, generally, designates a support therefor, the support consisting of a U-shaped structure having a base portion 10 relieved in order to provide supporting feet, or pads 12, and uprights 11 which are adapted to receive the bearing caps 26, being secured in place by virtue of cap screws 27, and being firmly located in place preferably by the tongue and groove structure designated 28.

The drum structure 13 is, preferably, crowned and is adapted most suitably for a belt drive or transmission. The drum 13 is secured to the outer end flanges 14 which are held in place by means of set screws 19, the said flanges 14 being suitably recessed in order to receive the ball-bearing units comprised of the outer races 20 and the inner races 21, having inescapably confined there between the ball-bearings proper. The inner compartment, confined between the outer flanges 14 and the drums 13, is provided with the centrally located annular gear 41 held in place by a number of screws 42 firmly secured to the drum 13, the said annular gear having its teeth in meshing engagement with the teeth 34 of an intermediate gear having reduced extensions 35 and further reduced terminal extensions 36 operating in the bearings 37 formed on the flanges 22, the said flanges also being provided with trunnion extensions, having an enlarged portion 23 and intermediately reduced portions 24 and terminally further reduced portions 25, the same being bored hollow as at 30 in order to receive the rotating shaft 31. The rotating shaft has secured thereto the driving pinion 33 by virtue of a pin 32 driven into its hub.

The rotating shaft 31 is in turn connected to a coupling unit 43 by virtue of the pin 44, the coupling unit in turn being connected to suitable motive power, or prime mover. The inner chamber confined between the flanges 14 and the outer drum 13, is segregated into three subcompartments designated 47, 48 and 49 by virtue of the positioning of the flanges 22, and the said subcompartments are sealably arranged to retain lubricant packed thereinto by virtue of the flanges 22 having secured thereto annular-like flanges 38 in order to confine the sealing packing 39, whereas the outer portions of the flanges 14 are provided with recesses of semi-circular cross-section 15 in order to retain and confine therein the sealing packing means 16 so as to confine lubricant which is packed into compartments 47, 48 and 49, confined within this area to furnish constant and permanent lubrication to the operative structure confined therein between.

It is, preferable, to have the flanges segregate the inner compartments and resolve it to individual sub-compartments 47, 48 and 49 so that the packing of the lubricant will not tend to accumulate in any one portion thereof. The lubricant is supplied thru the fittings 18 by removing the screws 17 which seal the said openings after the packing has been completed. The lubricant is applied, preferably, under pressure thru suitable pressure guns injecting grease into the compartments 47 and 48, and by virtue of the connecting passages, holes, or openings 61, the lubricant is also forced into the gear chamber and thus provides a path of lubricant for the gearing 33, 34, and 41.

The annular flanges 38 are secured to the flange structures 22 by means of screws 40 or other similar suitable fastenings, thus it can be seen that when a unit of this type is packed with lubricant, the lubricant will be confined therein and be prevented from being lost by virtue of the seals 16 and 39. Furthermore, it is to be noted that, the particular feature of my invention is to have a rotatable outer drum and the shaft or bearing support therefor stationary by virtue of set screws 29 being secured to the caps 16 and suitable indentations being formed on the termini 25 which may be countersunk so as to cause the set screws 29 to bite thereinto, thus confining the trunnions 23 and preventing rotation thereof.

The reduction gear shown in Figure 1, may be modified to provide various ratios of reductions depending on the gearing arrangement, and it may be, preferable, to modify the same as indicated in Figure 2 so as to facilitate assembly and dismantling thereof for repairs whenever they should be necessary, i. e., by having the shaft 31 cut with pinion teeth 45, which would engage an intermediate gear 46 of large enough diameter, in order to provide meshing engagement with the annular gear 41. This form would be, preferable, inasmuch as it would apparently be easy to remove the entire unit from the driving connection, by virtue of merely sliding the same out of place, as distinguished from the form shown in Figure 1 which would require dismantling of the end flanges and bearing caps 26 before that could be accomplished.

The structures of Figures 4 and 5 show a drum 13 which is, preferably, not crowned, in order to secure thereto a gear 57 which is provided with outer flanges 58 to permit the same to be firmly held to the drum 13 by virtue of screws 59, and thus provide a gearing engagement or meshing relationship with a unit to be ultimately driven to which is attached the driven gear 60. This arrangement is, preferably, centrally disposed on the drum 13; however, for a more balanced structure it may be, preferable, to modify this structure as indicated at Figure 5, by supplying two gears 50 having the shoulders 51, permitting their attachment at certain points on the periphery of the drum 13 by virtue of screws 52, the said gears 50 being in meshing relationship with gears 53 ultimately to be driven, and which are attached to a machine or unit which it is desired to motivate.

In Figure 6, I show a perspective view of a slightly modified form of my invention in which a sprocket 54, with a suitable hub permitting its attachment to the drum 13, is shown, and which is connected to a chain type of transmission, whereas in Figure 7, I show the balanced form wherein two sprocket 55 may be attached to the drum 13 in meshing relationship with chains 56.

The applications of reducing gears are many and well known, and it is needless to enumerate the same, since the application of the instant invention is readily obvious to those familiar with the art.

Altho, my invention has been suggestively shown and described, I reserve the right to any and all improvements suggested by the accompanying drawings, the foregoing description, and those falling within the purview of the objects to be attained.

Having thus described and revealed my invention, what I claim as novel and desire to secure by Letters Patent is:

1. A compact reduction gear unit comprising, a stator including a base having two upright support arms, flanged elements provided with hollow stub shaft extensions rigidly secured to the said upright support arms, seal means secured to the peripheries of the flanges of the said flanged elements, and an intermediate gear rotatably secured between the inner faces of the said flanged elements and eccentrically positioned with respect to the axis of said hollow stub shaft extensions; and a rotor including, a drum, drum flanges secured to each end of said drum, the said drum flanges provided with bearing means rotatably secured to the said hollow stub shaft extensions, and further provided with seal means fitted over the said hollow stub shaft extensions, the said drum being rotatably operative about the flanges of the said flanged elements, the said first-mentioned seal means in conjunction with the said second-mentioned seal means defining outer compartments adapted to retain a volume of lubricant, means on the said drum flanges providing access to the said outer compartments permitting lubricant under pressure to be packed and retained therein, the said flanged elements positioned so as to define an intermediate lubricant retaining compartment, an annular gear secured within the said drum and positioned in enmeshing relationship with the said intermediate gear, a shaft rotatably confined within the said hollow stub shaft extensions, and a pinion secured to the said shaft in meshing engagement with the said intermediate gear, the said flanged elements provided with bores furnishing communicating passages for lubricant from the said outer compartments to the said intermediate compartment.

2. A compact reduction gear unit for belt drive comprising, a stator including, a base having two upright support arms, flanged elements provided with hollow stub shaft extensions rigidly secured to the said upright support arms, seal means secured to the peripheries of the flanges of the said flanged elements, and an intermediate gear rotatably secured between the inner faces of the said flanged elements and eccentrically positioned with respect to the axis of said hollow stub shaft extensions; and a rotor including, a drum, drum flanges secured to each end of said drum, the said drum flanges provided with bearing means rotatably secured to the said hollow stub shaft extensions, and further provided with seal means fitted over the said hollow stub shaft extensions, the said drum being rotatably operative about the flanges of the said flanged elements, the said first-mentioned seal means in conjunction with the said second-mentioned seal means defining outer compartments adapted to retain a volume of lubricant, means on the said drum flanges providing access to the outer compartments permitting lubricant under pressure to be packed and retained therein, the said flanged elements positioned so as to define an intermediate lubricant retaining compartment, an annular gear secured within the said drum and positioned in enmeshing relationship with the said intermediate gear, a shaft rotatably confined within the said hollow stub shaft extensions, and a pinion secured to the said shaft in meshing engagement with the said intermediate gear, the said flanged elements provided with bores furnishing communicating passages for lubricant from the said outer compartments to the said intermediate compartment.

3. A compact reduction gear unit for gear drive comprising, a stator including, a base having two upright support arms, flanged elements provided with hollow stub shaft extensions rigidly secured to the said upright support arms, seal means secured to the peripheries of the flanges of the said flanged elements, and an intermediate gear rotatably secured between the inner faces of the said flanged elements and eccentrically positioned with respect to the axis of said hollow stub shaft extensions; and a rotor including, a drum, drum flanges secured to each end of said drum, the said drum flanges provided with bearing means rotatably secured to the said hollow stub shaft extensions, and further provided with seal means fitted over the said hollow stub shaft extensions, the said drum being rotatably operative about the flanges of the said flanged elements, the said first-mentioned seal means in conjunction with the said second-mentioned seal means defining outer compartments adapted to retain a volume of lubricant, means on the said drum flanges providing access to the said outer compartments permitting lubricant under pressure to be packed and retained therein, the said flanged elements positioned so as to define an intermediate lubricant retaining compartment, an annular gear secured within the said drum and positioned in enmeshing relationship with the said intermediate gear, a shaft rotatably confined within the said hollow stub shaft extensions, and a pinion secured to the said shaft in meshing engagement with the said intermediate gears, the said flanged elements provided with bores furnishing communicating passages for lubricant from the said outer compartments to the said intermediate compartment.

4. A compact reduction unit for chain drive comprising, a stator including, a base having two upright support arms, flanged elements provided with hollow stub shaft extensions rigidly secured to the said upright support arms, seal means secured to the peripheries of the flanges of the said flanged elements, and an intermediate gear rotatably secured between the inner faces of the said flanged elements and eccentrically positioned with respect to the axis of said hollow stub shaft extensions; and a rotor including, a drum, drum flanges secured to each end of said drum, the said drum flanges provided with bearing means rotatably secured to the said hollow stub shaft extensions, and further provided with seal means fitted over the said hollow stub shaft extensions, the said drum being rotatably operative about the flanges of the said flanged elements, the said first-mentioned seal means in conjunction with the said second-mentioned seal means defining outer compartments adapted to retain a volume of lubricant, means on the said drum flanges providing access to the said outer compartments permitting lubricant under pressure to be packed and retained therein, the said flanged elements positioned so as to define an intermediate lubricant retaining compartment, an annular gear secured within the said drum and positioned in enmeshing relationship with the said intermediate gear, a shaft rotatably confined within the said hollow stub shaft extensions, and a pinion secured to the said shaft in meshing engagement with the said intermediate gear, the said flanged elements provided with bores furnishing communicating passages for lubricant from the said outer compartments to the said intermediate compartment.

5. A compact reduction gear unit for belt drive comprising, a stator including, a base having two upright support arms, flanged elements provided with hollow stub shaft extensions rigidly secured to the said upright support arms, seal means secured to the peripheries of the flanges of the said flanged elements, and an intermediate gear rotatably secured between the inner faces of the said flanged elements and eccentrically positioned with respect to the axis of said hollow stub shaft extensions; and a rotor including, a drum, drum flanges secured to each end of said drum, the said drum flanges provided with bearing means rotatably secured to the said hollow stub shaft extensions, and further provided with seal means fitted over the said hollow stub shaft extensions, the said drum being rotatably operative about the flanges of the said flanged elements, the said first-mentioned seal means in conjunction with the said second-mentioned seal means defining outer compartments adapted to retain a volume of lubricant, means on the said drum flanges providing access to the outer compartments permitting lubricant under pressure to be packed and retained therein, the said flanged elements positioned so as to define an intermediate lubricant retaining compartment, an annular gear secured within the said drum and positioned in enmeshing relationship with the said intermediate gear, a shaft rotatably confined within the said hollow stub shaft extensions, and a pinion secured to the said shaft in meshing engagement with the said intermediate gear, the said flanged elements provided with bores furnishing communicating passages for lubricant from the said outer compartments to the said intermediate compartment, the said drum being crowned to maintain centrally in tractional relationship therewith a driving belt.

6. A compact reduction gear unit for gear drive comprising, a stator including, a base having two upright support arms, flanged elements provided with hollow stub shaft extensions rigidly secured to the said upright support arms, seal means secured to the peripheries of the flanges of the said flanged elements, and an intermediate gear rotatably secured between the inner faces of the said flanged elements and eccentrically positioned with respect to the axis of said hollow stub shaft extensions; and a rotor including, a drum, drum flanges secured to each end of said drum, the said drum flanges provided with bearing means rotatably secured to the said hollow stub shaft extensions, and further provided with seal means fitted over the said hollow stub shaft extensions, the said drum being rotatably operative about the flanges of the said flanged elements, the said first-mentioned seal means in conjunction with the said second-mentioned seal means defining outer compartments adapted to retain a volume of lubricant, means on the said drum flanges providing access to the said outer compartments permitting lubricant under pressure to be packed and retained therein, the said flanged elements positioned so as to define an intermediate lubricant retaining compartment, an annular gear secured within the said drum and positioned in enmeshing relationship with the said intermediate gear, a shaft rotatably confined within the said hollow stub shaft extensions, a pinion secured to the said shaft in meshing engagement with the said intermediate gear, the said flanged elements provided with bores furnishing communicating passages for lubricant from the said outer compartments to the said intermediate compartment, and gear means secured to the said drum adapted to engage in meshing relationship a gear driven unit.

7. A compact reduction unit for chain drive comprising, a stator including, a base having two upright support arms, flange elements provided with hollow stub shaft extensions rigidly secured to the said upright support arms, seal means secured to the peripheries of the flanges of the said flanged elements, and an intermediate gear rotatably secured between the inner faces of the said flanged elements and eccentrically positioned with respect to the axis of said hollow stub shaft extensions; and a rotor including, a drum, drum flanges secured to each end of said drum, the said drum flanges provided with bearing means rotatably secured to the said hollow stub shaft extensions, and further provided with seal means fitted over the said hollow stub shaft extensions, the said drum being rotatably operative about the flanges of the said flanged elements, the said first-mentioned seal means in conjunction with the said second-mentioned seal means defining outer compartments adapted to retain a volume of lubricant, means on the said drum flanges providing access to the said outer compartments permitting lubricant under pressure to be packed and retained therein, the said flanged elements positioned so as to define an intermediate lubricant retaining compartment, an annular gear secured within the said drum and positioned in enmeshing relationship with the said intermediate gear, a shaft rotatably confined within the said hollow stub shaft extensions, a pinion secured to the said shaft in meshing engagement with the said intermediate gear, the said flanged elements provided with bores furnishing communicating passages for lubricant from the said outer compartments to the said intermediate compartment, and sprocket means secured to the said drum adapted to engage in meshing relationship a chain driven unit.

8. A compact reduction gear unit for gear drive comprising, a stator including, a base having two upright support arms, flanged elements provided with hollow stub shaft extensions rigidly secured to the said upright support arms, seal means secured to the peripheries of the flanges of the said flanged elements, and an intermediate gear rotatably secured between the inner faces of the said flanged elements and eccentrically positioned with respect to the axis of said hollow stub shaft extensions; and a rotor including, a drum, drum flanges secured to each end of said drum, the said drum flanges provided with bearing means rotatably secured to the said hollow stub shaft extensions, and further provided with seal means fitted over the said hollow stub shaft extensions, the said drum being rotatably operative about the flanges of the said flanged elements, the said first-mentioned seal means in conjunction with the said second-mentioned seal means defining outer compartments adapted to retain a volume of lubricant, means on the said drum flanges providing access to the said outer compartments permitting lubricant under pressure to be packed and retained therein, the said flanged elements positioned so as to define an intermediate lubricant retaining compartment, an annular gear secured within the said drum and positioned in enmeshing relationship with the said intermediate gear, a shaft rotatably confined within the said hollow stub shaft extensions, a pinion secured to the said shaft in meshing engagement with the said intermediate gear, the said flanged elements provided with bores furnishing communicating passages for lubricant from the said outer compartments to the said intermediate compartment, and duplex gear means secured to the said drum adapted to engage in meshing relationship a gear driven unit.

9. A compact reduction gear unit for chain drive comprising, a stator including, a base having two upright support arms, flange elements provided with hollow stub shaft extensions rigidly secured to the said upright support arms, seal means secured to the peripheries of the flanges of the said flanged elements, and an intermediate gear rotatably secured between the inner faces of the said flanged elements and eccentrically positioned with respect to the axis of said hollow stub shaft extensions; and a rotor including, a drum, drum flanges secured to each end of said drum, the said drum flanges provided with bearing means rotatably secured to the said hollow stub shaft extensions, and further provided with seal means fitted over the said hollow stub shaft extensions, the said drum being rotatably operative about the flanges of the said flanged elements, the said first-mentioned seal means in conjunction with the said second-mentioned seal means defining outer compartments adapted to retain a volume of lubricant, means on the said drum flanges providing access to the said outer compartments permitting lubricant under pressure to be packed and retained therein, the said flanged elements positioned so as to define an intermediate lubricant retaining compartment, an annular gear secured within the said drum and positioned in enmeshing relationship with the said intermediate gear, a shaft rotatably confined within the said hollow stub shaft extensions, a pinion secured to the said shaft in meshing engagement with the said intermediate gear, the said flanged elements provided with bores furnishing communicating passages for lubricant from the said outer compartments to the said intermediate compartment, and duplex sprocket means secured to the said drum adapted to engage in meshing relationship a chain drive unit.

FRANK MILLER.

REFERENCES CITED

The following references are of record in the file of this patent:

UNITED STATES PATENTS

| Number | Name | Date |
| --- | --- | --- |
| 1,134,772 | Sundh | Apr. 6, 1915 |
| 1,836,225 | Christensen | Dec. 15, 1931 |